United States Patent [19]

de Bruyne et al.

[11] Patent Number: 5,013,874
[45] Date of Patent: May 7, 1991

[54] APPARATUS FOR RECORDING AND VERIFYING HANDWRITING, IN PARTICULAR SIGNATURES

[75] Inventors: Pieter de Bruyne, Zurich; Andre Kunz, Kloten, both of Switzerland

[73] Assignee: Ellett Brothers, Chapin, S.C.

[21] Appl. No.: 319,696

[22] Filed: Mar. 7, 1989

[30] Foreign Application Priority Data

Mar. 7, 1988 [CH] Switzerland .................... 00919/88

[51] Int. Cl.$^5$ ............................................. G08C 21/00
[52] U.S. Cl. ................................................... 178/18
[58] Field of Search ................ 178/18, 19; 340/712; 382/3, 58

[56] References Cited

U.S. PATENT DOCUMENTS

| 3,563,097 | 2/1971 | Roggenstein et al. | 73/432 |
|---|---|---|---|
| 3,699,253 | 10/1972 | Freedman | 178/19 |
| 3,808,364 | 4/1974 | Veith | 178/19 |
| 3,991,402 | 11/1976 | Radcliffe, Jr. | 340/146.3 |
| 4,110,556 | 8/1978 | Hawkes | 178/19 |
| 4,234,868 | 11/1980 | Radice | 340/146.3 |
| 4,397,033 | 8/1983 | Bechet | 382/3 |
| 4,475,235 | 10/1984 | Graham | 382/3 |
| 4,484,026 | 11/1984 | Thornburg | 178/18 |
| 4,570,149 | 2/1986 | Thornburg et al. | 338/114 |
| 4,617,515 | 10/1986 | Taguchi et al. | 324/207 |
| 4,653,107 | 3/1987 | Shojima et al. | 382/13 |
| 4,677,259 | 6/1987 | Abe | 178/18 |
| 4,733,023 | 3/1988 | Tamaru et al. | 178/20 |
| 4,748,672 | 5/1988 | Nevill, Jr. et al. | 382/1 |
| 4,800,240 | 1/1989 | Bechet | 178/18 |

FOREIGN PATENT DOCUMENTS

| 0235494 | 9/1987 | European Pat. Off. |
|---|---|---|
| 3236057 | 3/1984 | Fed. Rep. of Germany |
| 3236099 | 3/1984 | Fed. Rep. of Germany |
| 615032 | 12/1979 | Sweden |
| 2172113A | 9/1986 | United Kingdom |

OTHER PUBLICATIONS

Abstract of Soviet Union Certificate of Inventorship 638,988 to Rybkin et al.
"Signature Verification Using Holistic Measures", by P. de Bruyne, published in Computers & Security, vol. 4, No. 4, Dec. 1985.
"High Resolution CRT Display Overlay for Probe Position Determination", IBM Technical Disclosure Bulletin, vol. 29, No. 10, Mar. 1987.

Primary Examiner—Stafford D. Schreyer
Attorney, Agent, or Firm—Banner, Birch, McKie & Beckett

[57] ABSTRACT

A signature verification tablet comprises two piezoelectric membranes each having a plurality of line electrodes on one side. The membranes are sandwiched together, with the line electrodes on one membrane at right angles to the line electrodes on the other. The line electrodes on each membrane are connected together in three interleaved sets, so that when a signature is written on the tablet, a series of pulses is produced containing direction and speed of movement information from which the authenticity of the signature can be verified.

9 Claims, 2 Drawing Sheets

APPARATUS FOR RECORDING AND VERIFYING HANDWRITING, IN PARTICULAR SIGNATURES

BACKGROUND OF THE INVENTION

This invention relates to apparatus for recording and verifying handwriting, in particular signatures.

Piezo-electric films used for verification of signatures written with any common writing pen or stylus are taught in U.S. Pat. No. 4,234,868. The pressure-time profiles recorded with such a system are difficult to reproduce by a forger, since each person has his or her individual timed sequences of hand movements when writing his or her signature.

However, such pressure-time profiles, recorded with piezo-electric membranes and a single electrode above and below the membrane, are often adversely affected by voltages produced by changing airspaces between the film and its substrate. These voltages are superimposed on the desired pressure-dependent signal, and are caused by changes in capacitance of the film with respect to its shielding. The resulting voltages often obscure the desired signal produced by the strain in the piezo-electric film, and thus reduce the efficacy of such pressure-time profile correlation devices in commercial applications.

Furthermore there is a whole range of dynamic features, based on variations in speed and direction of the pen or stylus, which cannot be recorded by a device which merely captures the pressure-time profile. German patent application Nos. DE-A3 236 057 and DE-A3 239 099 describe piezo-electric sensor tablets which could be used to track the position of a pen and thus record the dynamic features of changes in speed and direction mentioned above. However, in order to accurately record the position of the pen, a large number of individually connected electrodes are required, each having a sensing amplifier, threshold detector and associated circuitry.

SUMMARY OF THE INVENTION

The identity of a person can be verified by using the dynamic attributes of his handwritten signature. Dynamic attributes contain timing, direction and sequencing information, which can be gathered only during the timespan that the signature is being written. It is an object of the present invention to overcome the disadvantage of the large number of connections with associated circuitry which would be required for such a signature verification device using the hardware concepts of the aforementioned German patent application Nos. DE-A-3 236 057 and DE-A-3 239 099.

According to the invention, apparatus for recording and verifying handwriting is characterised in that at least three sets of line electrodes on a piezo-electric film are arranged in the form of interleaved arrays. Hence, and as will be apparent hereinafter, only about three to six connections and thresholding amplifiers are required. Preferably, signals are produced differentially between sets of electrodes when a pen moves from an element of one set to an element of another set. The invention is further characterised in that common mode disturbances such as those which are caused by shifting airgaps and electrostatic charges are cancelled out. An array of three interleaved sets of linear electrodes is applied to one surface of the piezo-electric film. The other side of this film has a solid electrode connected to ground. It is hence possible to record the direction and the speed of motion of the pen or stylus. This is achieved by recording the number of pulses from each set of electrodes and noting their relative sequence. The sequence 1, 2, 3, 1 would correspond to a movement to the right, whilst 1, 3, 2, 1 would correspond to a movement to the left. A similar array of interleaved sets on another film is preferably mounted so as to be orthogonal to the direction of the first set. By processing the output from the arrays on both films the complete velocity-time profiles in the XY plane may be reconstructed and recorded. This permits on-line recording of dynamic features of the signature and verification of these features with those recorded from a set of reference signatures written by the person at a previous point in time. Algorithms used in computing the validity of such signatures using both static and dynamic features are described in the literature, for example in Swiss Pat. No. 615 032, in the paper "Signature Verification with Elastic Image Matching" by P. de Bruyne and R. Forre, Proceedings of the International Carnahan Conference on Crime Countermeasures, Gotheborg (1986), pp. 113 to 118 and in the article by P. de Bruyne entitled "Signature Verification using Holistic Measures" in Computers and Security 4 (1985), pp 309–315.

PRINCIPLE OF THE INVENTION

To summarise the principle of the invention, as a hand-held stylus or pen moves along a piece of paper with a pressure sufficient to cause a mark, eg a signature, this pressure is transmitted to a thin plastic piezo-electric membrane or film, below the paper. This plastic film has a large number of linear electrodes on one side connected together as a number of interleaved sets, preferably three sets. The other side of the film has a solid electrode connected to ground. The electrodes applied to one side of the piezo-electric film are in the form of uniformly spaced parallel lines. A further three similar sets of electrodes may be applied to a second film. These further three sets are generally oriented at right angles, that is orthogonal, to the sets of electrodes applied to the firstmentioned film. The output voltages of the electrode sets are each passed to a respective amplifier. The outputs of these are connected in pairs to comparators, which in effect are operational amplifiers driven to saturation whenever the applied differential input voltage exceeds a given threshold voltage. The outputs of these comparators are not influenced by temperature effects, microphonics or other common mode signals. They respond only to transition of the pen from one set of electrodes to another set. These signals are sent to a computer to record motion of the stylus or pen during the writing of the signature.

BRIEF DESCRIPTION OF THE DRAWINGS

The invention will now be explained in more detail, by way of example only, with reference to the accompanying drawings, in which.

the sense of direction being detected from the sequence of the pulses produced.

DETAILED DESCRIPTION OF A PREFERRED EMBODIMENT

Figure 1A:
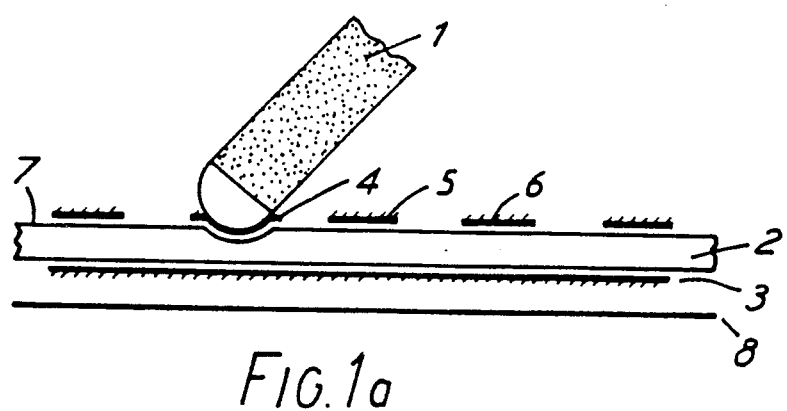
FIG. 1 (made up of FIGS. 1a and 1b) shows diagrammatically a piezo-electric membrane with an electrode being deformed by the pressure of a stylus.
Figure 1B:
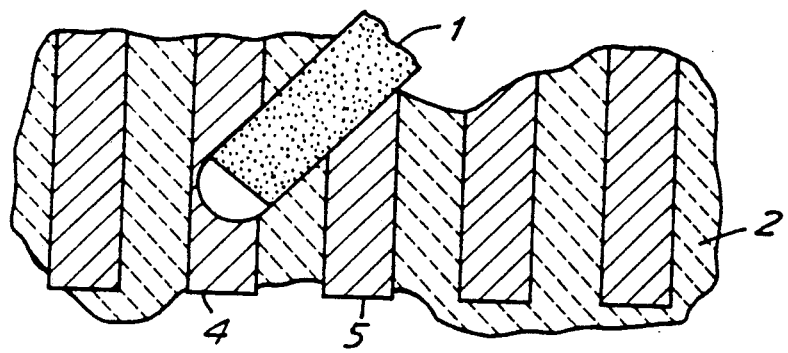

FIGS. 1a and 1b show the deformation produced when a stylus 1, such as a ball point pen, traverses a piezo-electric membrane 2 having a single electrode 3 covering substantially the whole of its underside and a plurality of parallel line electrodes, eg as shown at 4, 5 and 6, on its upper surface 7. The compression of the membrane 2 when the stylus 1 presses on the electrode 4 gives rise to a change in potential between the electrode 4 and the opposing electrode 3. This change is detectable as a difference voltage between the electrode 4 and its neighbouring electrode 5 relative to the common potential on electrode 3. Beneath the membrane 2 is a substrate of a hard material. Writing paper and an electrostatic shield are normally interposed between the stylus 1 and the surface 7, but have not been shown in the drawing for the sake of simplicity: they do not affect the described principle of operation. The arrangement of the electrodes 4, 5, 6 can be best seen in the plan view of FIG. 1b.

Figure 2:
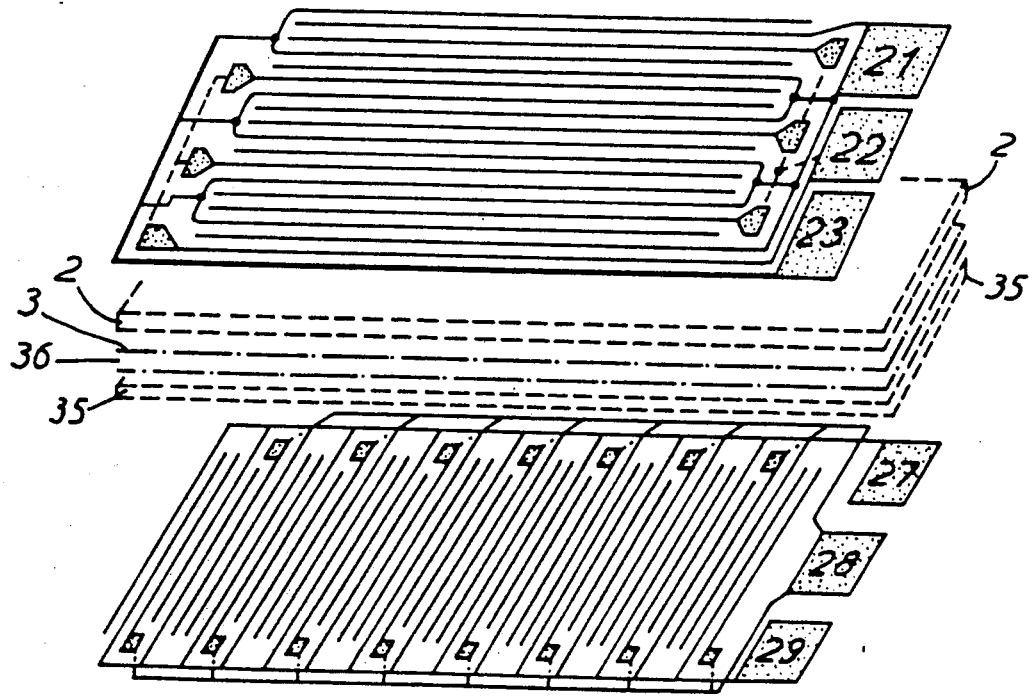
FIGS. 2 and 3 show a preferred embodiment, having three sets of electrodes on a top membrane and three sets on a bottom membrane.
Figure 3:
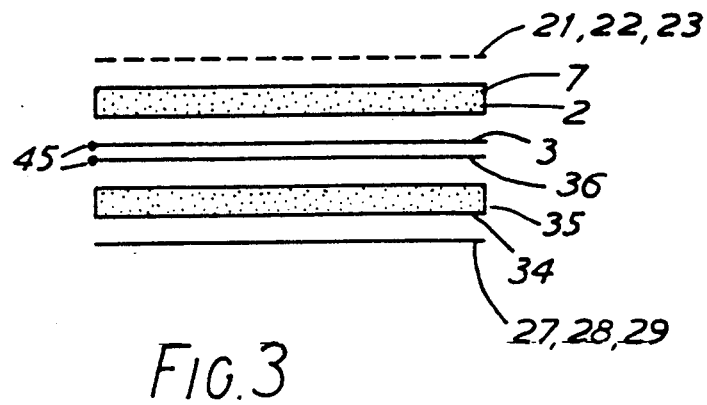

FIGS. 2 and 3 show a preferred embodiment of the invention, characterised by having three interleaved sets 21, 22, 23 of parallel line electrodes attached, or in contact with, one side of the membrane 2 and a second membrane 35 similar to the first and having another three sets 27, 28, 29 electrodes oriented at right angles to the first set, disposed immediately underneath the membrane 2. The membranes 2 and 35 are the opposite way up, i.e., the electrode sets 27, 28, 29 of the membrane 35 are on the undersurface 34 thereof, which is the surface remote from the membrane 2 and adjacent the substrate 8 (not shown in FIGS. 2 and 3), and their respective single electrodes 3 and 36 are connected together at 45.

Figure 4:
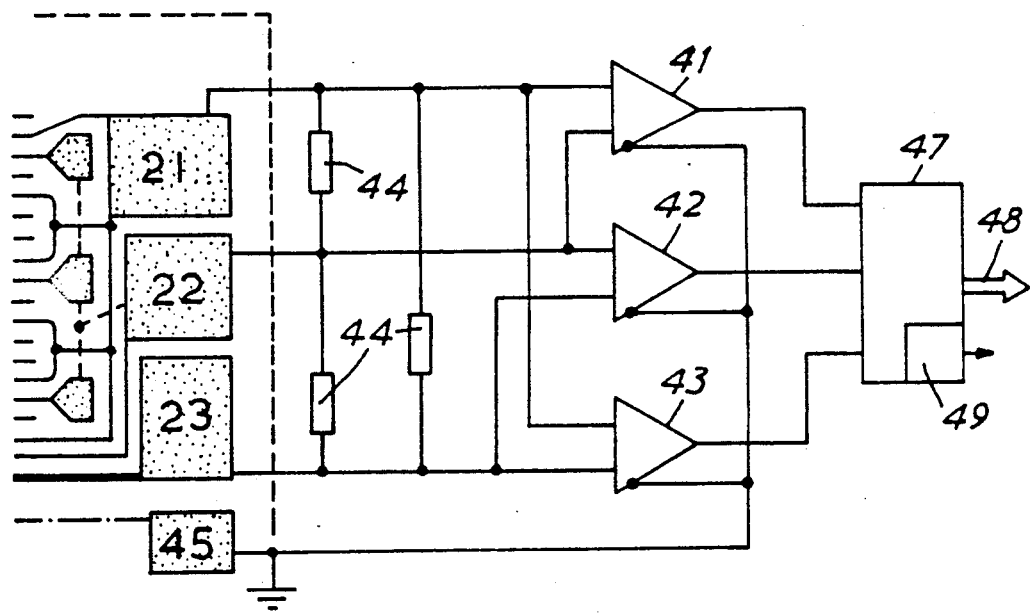
FIG. 4 is a diagram of a circuit arrangement used in connection with three sets of electrodes to detect the voltages created when a stylus traverses the electrodes.

FIG. 4 shows the circuitry connected between the sets 21, 22, 23 of electrodes of the membrane 2 and the connection point 45 of the electrodes 3 and 36: precisely similar circuitry is connected between the sets 27, 28, 29 of electrodes of the membrane 35 and the connection point 45. With reference to FIG. 4, three similar load resistors 44 are connected between each pair of the sets 21, 22, 23 of electrodes (i.e. between the sets 21 and 22, 21 and 23, 22 and 23), so that movement of a stylus across the membranes 2 and 35 causes a succession of voltage transients, or pulses, to appear across the load resistances 44. The direction and speed of motion of writing is given by the sequence sense and frequency of these pulses. Since the sets of electrodes of the membrane 2 are at right angles to the sets of the membrane 35, the velocity of the stylus will be resolved both in sense of direction, up-down and right-left, and in speed.

Each pair of sets 21, 22, 23 of electrodes is connected to the inputs of a respective one of three voltage comparators 41, 42 and 43, which interface with digital electronics. These comparators are connected to provide a suitable voltage threshold and voltage hysteresis to give the required sensitivity, and they provide output levels which are used to set the data buffer 47 and data flag 49 indicating that the buffer has data to be read out by a standard RS232 interface 48 into a suitable signal processor.

Suitable forms of signal processing to be carried out by the signal processor are described in the literature mentioned hereinbefore, and in the article "Developments in Signature Verification" by P. de Bruyne in Security Management, Vol. 22, No. 6 (1978), pp 57–61, and in the article by G. Sulger Buel entitled "Identitaetsueberpruefung durch Unterschriftsverifikation," in Neue Zuercher Zeitung 24 March 1982 No. 69, p73.

Several modifications can be made to the described embodiment of the invention. In particular, the sets 21, 22, 23 of electrodes and the sets 27, 28, 29 of electrodes can be provided on the opposite sides of a single piezo-electric membrane. In this case, the electrodes connected to the connection point 45 can be restricted to a limited area around the periphery of the membrane, outside the area over which the signature would normally be written.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. Apparatus for producing electrical signals representative of the movement of a hand-held stylus, the apparatus comprising a first piezo-electric membrane upon which the stylus is pressed during its movement, said membrane comprising a solid reference electrode on a first surface and a system of narrow and parallel linear electrodes on a second surface, characterized in that the electrodes are connected together as at least three interleaved sets.

2. Apparatus according to claim 1, characterised by a respective differential amplifier connected between each pair of sets of electrodes.

3. Apparatus according to claim 1, characterized in that additional membrane layers are used each with a different spatial resolution to obtain coded information regarding the position of the moving stylus.

4. Apparatus according to claim 1 wherein said electrodes are connected together as three interleaved sets.

5. An apparatus according to claim 1 further comprising a second piezo-electric membrane disposed immediately underneath said first membrane, said second membrane comprising a system of narrow and parallel linear electrodes on an undersurface of said second membrane.

6. An apparatus for producing electrical signals representative of the movement of a hand-held stylus, said apparatus comprising:
    a piezo-electric membrane having an under surface and an upper surface;
    a reference electrode on said under surface; and
    a plurality of interleaved sets of narrow, parallel, linear electrodes on said upper surface to indicate the movement of said stylus.

7. An apparatus according to claim 6 wherein said reference electrode covers substantially the whole of said under surface so that compression of said membrane by pressure from said stylus produces a detectable voltage difference between said reference electrode and one of said electrodes on the upper side of said membrane.

8. An apparatus according to claim 6 further comprising a hard surface disposed below the under surface of said membrane.

9. An apparatus for producing electrical signals representative of the movement of a hand-held stylus, said apparatus comprising:
   a piezo-electric membrane having an under surface and an upper surface;
   a reference electrode on said under surface; and
   interleaved sets of narrow, parallel, linear electrodes on said upper surface which will indicate the movement of said stylus.

* * * * *